Dec. 1, 1970 V. RISO 3,544,812
ANALOG MULTIPLIER
Filed Dec. 18, 1967 3 Sheets-Sheet 1

INVENTOR:
VLADIMIR RISO
BY Homer L. Kneal
AGENT

United States Patent Office 3,544,812

Patented Dec. 1, 1970

3,544,812

ANALOG MULTIPLIER

Vladimir Riso, Nice, France, assignor to International Business Machines Corporation, Armonk, N.Y., a corporation of New York Filed Dec. 18, 1967, Ser. No. 691,471
Int. Cl. G06g 7/16
U.S. Cl. 307—229 8 Claims

ABSTRACT OF THE DISCLOSURE

The analog multiplier makes use of a variable impedance characteristic of a field effect transistor as controlled by its gate-to-source voltage V*gs*. The output of a high gain difference amplifier is applied to the gate of a field-effect transistor. The drain of the transistor is connected to a negative potential source —U, while the source terminal of the transistor is connected through an output resistor to a positive potential source +U of the same magnitude. A first input to the difference amplifier is driven by analog signal V*e* through a resistor; the other input of the difference amplifier is grounded. In addition, the source terminal is also connected via a feedback resistor to the first input of the difference amplifier.

The high gain difference amplifier drives the field effect transistor so that the source voltage will vary linearly with the analog signal V*e*. This action of the amplifier is guaranteed by the feedback of the source voltage to the first input of the difference amplifier. Since the source voltage is forced to vary directly with V*e*, the current from source to drain is forced to vary directly with V*e*. This in turn forces the R*ds* (resistance between drain and source terminals) of the field effect transistor to vary linearly with V*e*.

The linear variation of R*ds* with V*e* can be used to multiply V*e* times another signal in a variety of configurations. First, where the second signal has a frequency domain which does not overlap V*e*'s frequency domain, multiplication is achieved by using the second signal as the positive and negative potential sources +U and —U. The voltage at the source terminal is then a constant K times V*e* times U or $Vs=K\cdot Ve\cdot U$. Of course, a filter must be placed in the feedback from V*s* to the input of the difference amplifier. The filter passes signals due to V*e* and blocks signals due to U.

In a second configuration where V*e* and the other multiplied signal have the same frequency domain, two stages of operation are required. The first stage is the same as described above except that U is a DC voltage and no filter is required in the feedback loop. The output from the first stage is taken from the output of the difference amplifier or in other words the gate voltage of the field effect transistor. This gate voltage is varying in a manner to cause the R*ds* of the transistor to vary linearly with V*e*. This first stage gate voltage is passed to the second stage which is also made up of a difference amplifier and a field effect transistor whose gate is tied to the output of the difference amplifier. The first stage gate voltage is amplified by the second stage difference amplifier and used to drive the second stage field effect transistor. Since the second stage field effect transistor is matched to the first stage field effect transistor, it will be driven so that its R*ds* varies linearly with V*e*. Therefore, analog multiplication of the input signal at the first stage with another signal can be accomplished by applying the other signal across the variable impedance of the second stage field effect transistor.

BACKGROUND OF THE INVENTION

The invention relates to an analog multiplier which makes use of a controlled impedance device having good isolation between its impedance terminals and its impedance control terminal. The impedance device may be nonlinear as the linearity is achieved by circuitry used with the device.

In analog computers in the prior art, the analog multiplication is obtained through the use of paired multielectrode valves such as pentodes. These valves act as voltage sensitive gain devices so that the amplification by these valves of a first signal can be adjusted by the response of the valves to a second signal which is applied to a gain control electrode. However, such tube circuits lack stability and require precise matching of the electronic tubes used. Furthermore the gain characteristics are also unstable and are subject to important variations which are caused by temperature and aging. Accordingly, precise matching of circuit components is very critical and frequent servicing and adjustment of the devices are required.

Another type of known analog multiplication circuit uses a gain control feedback amplifier circuit which contains a voltage sensitive feedback impedance. This feedback impedance can take the form of a field effect transistor or any other type of known voltage sensitive impedance device. The gain obtained with such a feedback circuit is approximately equal to the feedback impedance divided by the input impedance.

Since the field effect transistor impedance is sensitive to DC voltages, the DC control voltage $E_2$ which is applied to the field effect transistor's control or gate terminal, causes a variation of the impedance from drain to source in the transistor. The variation in impedance is the function of the signal $E_2$. Consequently, the gain of the feedback amplifier varies in function of the control voltage $E_2$. The result is that the amplifier output $E_0$ indicates the product of the input $E_1$ and of the function of the control voltage $E_2$, i.e., $E_0=E_1\cdot f(E_2)$. However, this arrangement is not sufficient for analog multiplication because the function of $E_2$ is not a linear function. Therefore, the output $E_0$ is not simply a constant times the product of $E_1$ and $E_2$. The nonlinearity is caused by the field effect transistor which does not in general decrease linearly to 0 when the applied control voltage $E_2$ falls to that value. Consequently, there is an error value $B_0$ when the applied control voltage $E_2$ is 0. Thus for a control voltage $E_2=0$ the output voltage $E_0=B_0E_1$. In addition for all other values of $E_2$, the output is not the simple product of $E_1$ and $E_2$.

The prior art analog multiplication circuits have not provided high precision analog means which are at the same time reliable and capable of being applied to microminiaturization techniques. Furthermore, the use of field effect transistors in analog multiplication circuits has not been satisfactory in the prior art because of the nonlinearities in the deveice and also the inability to zero the device when the control voltage is 0.

It is an object of this invention to obtain analog multiplication with a circuit which is reliable and capable of being implemented with microminiaturization techniques.

It is another object of the invention to control the impedance of a variable impedance device so that the impedance is a linear function of variations in a control voltage and so that the device can be zeroed when the control voltage is zero.

It is another object to obtain perfectly linear variation of a field effect transistor impedance as a function of variations in a controlling voltage.

It is another object of the invention to multiply two analog signals using a variable impedance device where the variable impedance is a linear function of one analog signal so that current through the impedance will be equal to a constant times a product of the two analog signals.

PRINCIPLE OF THE INVENTION

The above objects of the invention are accomplished by driving an impedance device which has a nonlinear characteristic with a waveform varying in such a manner as to cause the impedance in the impedance device to vary linearly with an input signal. In other words, the input signal affects the drive function in such a manner as to vary the impedance in the impedance device so that it varies linearly with the input signal. This has been accomplished by driving the gate of a field effect transistor with the output of a difference amplifier and feeding back the source voltage to the input of the difference amplifier receiving the input signal. The other input of the difference amplifier is grounded.

Multiplication may then be achieved by biasing the impedance of the field effect transistor with a signal of a different frequency than the input signal controlling the impedance. The resulting current through the impedance device will be a constant time the product of the input signal and the biasing signal.

Multiplication with signals of the same or overlapping frequency domains can be accomplished in a two stage operation wherein the second stage has an identical impedance device which is driven by the same or amplified drive signal applied to the nonlinear impedance device in the first stage and where the biasing signal is applied to the nonlinear impedance in the second stage so as to isolate the application of the biasing signal from the generation of the drive signal which causes the nonlinear impedance device to vary linearly with the input signal.

Either of the above embodiments has many advantages over prior analog multipliers. First of all the devices have a very linear characteristic and may be adjusted to have zero output when the input signal is zero. In addition, the devices are solid state and thus lend themselves to integrated circuitry and simple construction. Also, the multiplier is very stable and relative to prior tube circuits it is relatively insensitive to temperature and aging. The above and other features, advantages and objects of the invention will become more apparent from the following description as illustrated in the accompanying drawings.

DESCRIPTION

Figure 1:
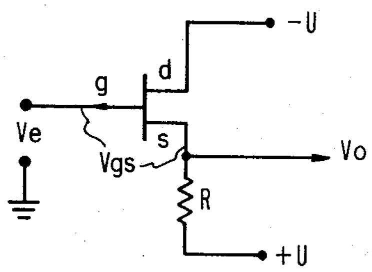
FIG. 1 shows a circuit diagram of a field effect transistor used with a bias across the drain to source terminals and having a resistor connected to the source terminal to provide an output signal.
Figure 2:
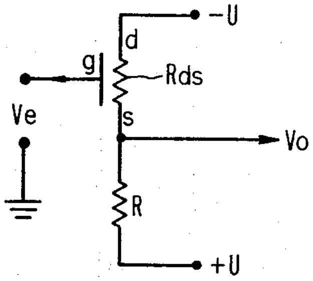
FIG. 2 is the same circuit as FIG. 1 except the field effect transistor is shown as a resistance controlled by a gate with no current flow path between gate and the controlled resistance R*ds* between drain and source.

Referring to FIG. 1, an attenuator assembly comprises a field effect transistor and a resistor R. Voltages +U and −U, of same values but of opposed phases, are applied to the terminals of the attenuator and a voltage *e* is applied to gate *g* of the field effect transistor, at the source *s* of which an output voltage V*o* is taken. The circuit, represented on FIG. 1, is similar to that of FIG. 2 in which R*ds* represents the field effect transistor drain-source resistance. In this assembly, we can write the expression of V*o*, in function of voltage U and of resistances R and R*ds*.

$$Vo=U-\frac{2U\times R}{R+Rds} \quad (1)$$

thus $$Vo=U\left(\frac{Rds-R}{Rds+R}\right) \quad (2)$$

Furthermore, it is known that the resistance *Rds* of a field effect transistor can be expressed as follows:

$$Rds=\frac{1}{\frac{2Idss}{Vp}\left(\frac{Vgs}{Vp}-1\right)} \quad (3)$$

Where: I*dss* is current from drain to source for V*gs*=0, and V*p* is "pinch off" voltage.

We can see from the formula above that resistance R*ds* is a function of a voltage V*gs* and consequently we can write:

$$Vo=U\left[\frac{f(Vgs)-R}{f(Vgs)+R}\right] \quad (4)$$

$$Vo=Ufx(Vgs,\ R) \quad (5)$$

If a linearly increasing voltage *e* is applied to gate *g* of a field effect transistor, source *s* does not vary linearly. This is the case for the assembly of FIG. 1, where the output voltage V*o* does not vary linearly with voltage *e*. In order to determine the law of variation of the transistor gate/source voltage which will permit a linear variation of V*o* when *e* varies linearly, the attenuator of FIG. 1 is introduced in an amplifier feedback loop, as can be seen in the first stage of FIG. 3.

Figure 3:
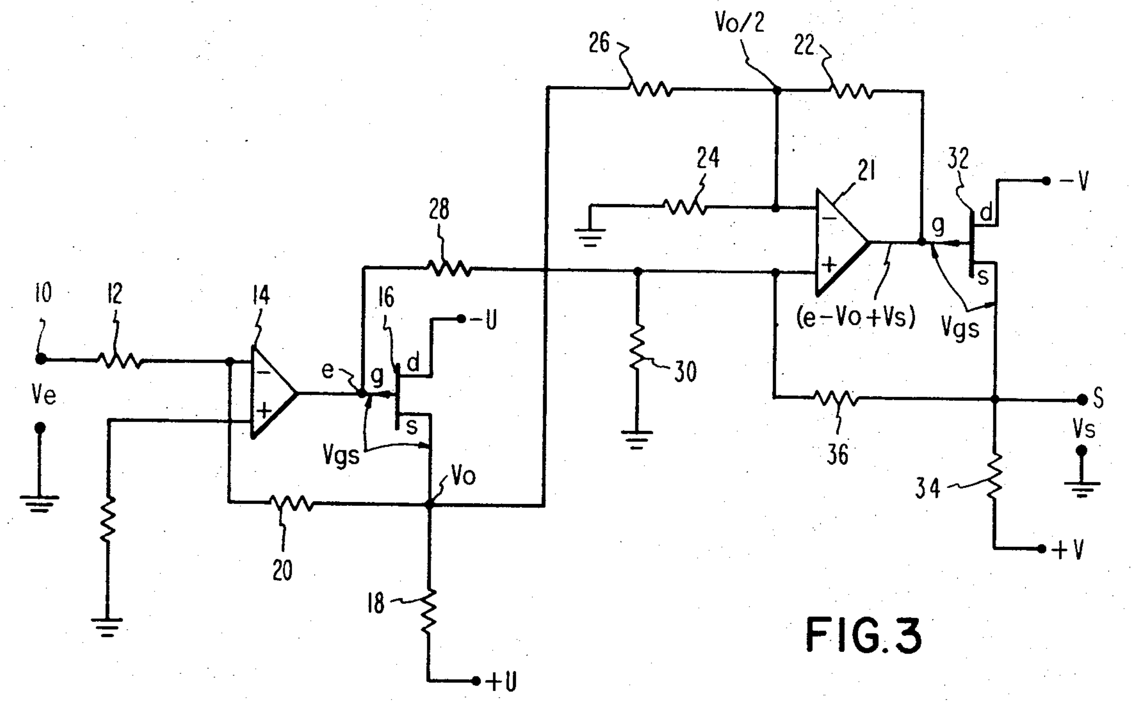
FIG. 3 is a circuit diagram of one embodiment of the analog multiplication wherein the analog signals to be multiplied have overlapping frequency domains.

FIG. 3 represents an analog multiplication circuit designed in accordance with the present invention. An AC voltage V*e* is applied to input 10 of this circuit and, through resistor 12, to the difference amplifier 14. The output voltage *e* from the said amplifier, taken in relation to ground, is applied to the gate *g* of a field effect transistor 16 which, combined with a resistor 18, forms an attenuator such as the one represented on FIG. 1. DC voltages +U and −U, of same values but of opposed phases, are applied to the terminals of this attenuator assembly. A feedback loop connects the source of transistor 16 to the amplifier 14 input, via a feedback resistor 20. A voltage V*o*, already defined, is taken from the source of transistor 16.

In such an assembly, it is possible to express voltage V*o* in function of input voltage V*e*, for instance:

$$Vo=\frac{R20}{R12}\cdot Ve \quad (6)$$

where R12 and R20 are the resistance values of resistors 12 and 20 respectively. This indeed provides linear variation of V*o*, when V*e* varies linearly, whereas the assembly represented on FIG. 1 did not do so.

By equating Expressions 5 and 6 we can obtain the expression of function *f*(V*gs*, R), R being in the present case the resistance R18 of resistor 18. Thus:

$$f(Vgs,\ R18)=\frac{R20}{R12}\times\frac{Ve}{U} \quad (7)$$

But V*gs* is also (*e*−*Vo*). In order to have the same V*gs* control voltage applied to the gate of the other stage field effect transistor, so as to compensate the distortions introduced into the multiplication (by making linear the source voltage variations of this other stage field effect transistor, when its gate voltage varies linearly), voltages $e$ and $Vo$ will be transferred to the second stage. To this end, an amplifier 21, whose gain is equal to 2 because resistors 22 and 24 are of equal value, will receive $Vo$ on its negative input via a resistor 26 whose value is equivalent to that of resistors 22 and 24 while its positive input will receive voltage $e$, after passage of the latter through potentiometer 28 which, with resistor 30 forms, a halving voltage divider, resistor 30 value being equivalent to that of resistor 28. The output from amplifier 21 is applied to gate $g$ of a field effect transistor 32, identical to transistor 16, which in combination with resistor 34 forms an attenuator similar to the one represented on FIG. 1.

AC voltages $+v$ and $-v$, of similar value but of opposed phases, are applied to the terminals of the assembly. This AC voltage $v$ corresponds to the second analog signal used in the multiplication (the first one being $Ve$). A feedback loop, including resistor 36 whose value is the same as that of 28 and 30, connects source $s$ of transistor T2 to the positive input of amplifier 21. Voltage $Vs$, taken from the source $s$ of 32, provides the multiplication result to within a certain scale factor.

Voltage $e$ having gone through the divider made up of resistors 28 and 30 of equal value, it is a voltage $e/2$ that is applied to the positive input of gain amplifier 21 which amplifies by two, and reproduces voltage $e$ on its output.

Voltage $Vo$ having gone through the divider made up of resistors 26 and 24, of equal value, it is a voltage $Vo/2$ that is applied to the negative input of gain amplifier 21, which amplifies by two and reproduces voltage $-Vo$ on its output.

The output voltage produced by amplifier 21 is therefore $e-Vo$, but then the $Vgs$ voltage of transistor T2 is equal to the amplifier 21 output voltage minus output voltage $Vs$, and we also require that this $Vgs$ voltage be equal to field effect transistor 16 control $Vgs$ voltage. Consequently, a voltage $Vs/2$ will be injected in amplifier 21 via the voltage divider formed by resistances 36 and 30 of equal value, and a voltage $Vs$ will be reproduced at the output of said amplifier.

At the output of amplifier 21, we thus have a voltage $(e-Vo+Vs)$ and, consequently, the $Vgs$ voltage of transistor 32 is equal to $(e-Vo+Vs)-Vs$, that is to say $(e-Vo)$. Transistor 32 has therefore received a control voltage $(e-Vo)$ which is identical to that already detected on transistor 16.

As for transistor 16 we had expressed:

$$Vo=Uxf(Vgs, R18) \quad (8)$$

We can express for T2:

$$Vs=vxf(Vgs, R34) \quad (9)$$

Supposing that R18 and R34 are made equal and that for transistors 16 and 32 the "pinch off" voltages $Vp$ and the currents $Idss$ are respectively equivalent, we have indeed identity of functions $f(Vgs, R)$ and, in consequence, by a substitution of Expressions 8 and 9 we obtain:

$$Vs=v\cdot\frac{Vo}{U} \quad (10)$$

but $$Vo=\frac{R20}{R12}\cdot Ve$$

therefore $$Vs=\frac{R20}{R12}\cdot\frac{1}{U}\cdot Ve\cdot v \quad (11)$$

Thus the analog multiplication of AC voltages $Ve$ and $v$ has indeed been realized, to within a constant factor $$\left(\frac{R20}{R12}\times\frac{1}{U}\right)$$

By means known in the art, it is easy to make this factor equal to 1.

During the previous operations it was assumed that voltages $Vp$ of transistors 16 and 32 were equal, as well as their currents $Idss$. However, in general $Vp$ 16$\neq Vp$ 32 and $Idss$ 16$\neq Idss$ 32; $Vp$ 16 and $Idss$ 16 being the characteristics of transistor 16, and $Vp$ 32 and $Idss$ 32 being the characteristics of transistor 32, it is possible to adjust two parameters to make $Vp$ 16$=Vp$ 32 and $Idss$ 16$=Idss$ 32.

The two parameters mentioned take the form of potentiometers 34 and 28, the former being adjusted when $Ve=0$ so as to obtain $Vs=0$, while the latter is adjusted when $Ve$ is maximum so as to obtain:

$$Vs=\frac{R20}{R12}\cdot\frac{1}{U}\cdot Ve\cdot v$$

Figure 4:
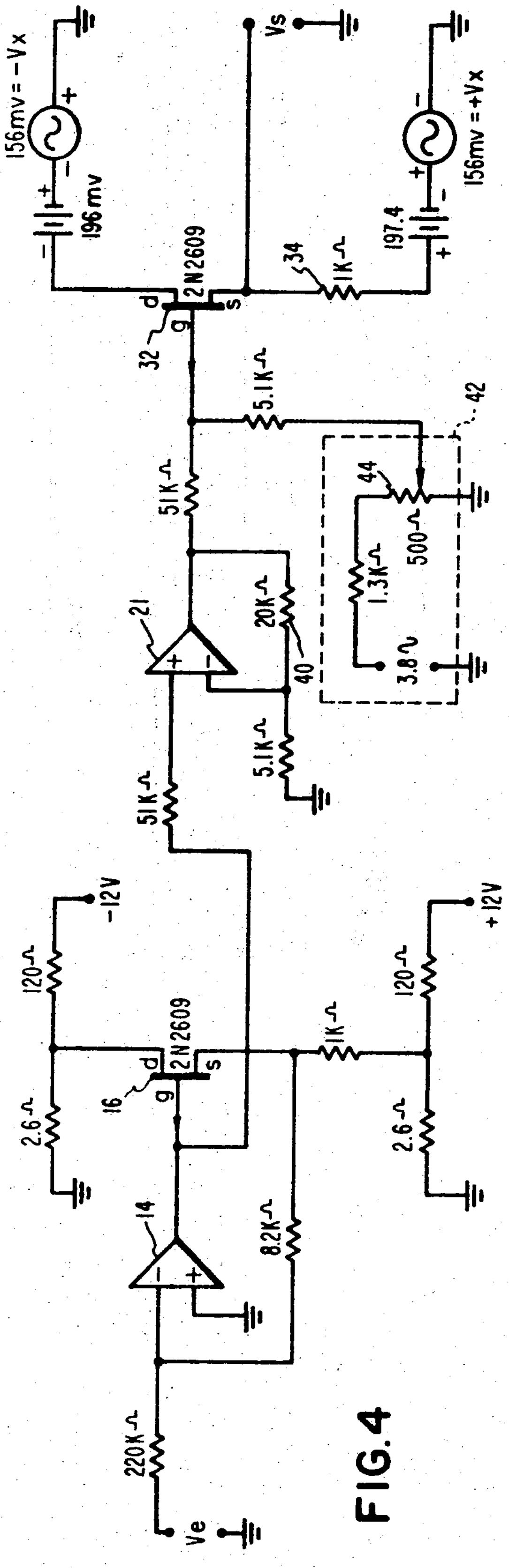
FIG. 4 is similar to FIG. 3 except that the coupling between the first and second stages to achieve multiplication of signals having overlapping frequency domains is slightly different.

Referring to FIG. 4 now, an embodiment of the invention similar to FIG. 3 is shown. FIG. 4 will be described only to the extent of pointing out differences from FIG. 3. The most significant difference is that the only signal fed from the first stage to the second stage is the gate signal of transistor 16 in the first stage. This gate signal is amplified by amplifier 21 and used to drive the gate of the field effect transistor 32 in the second stage. Thus, the second stage field effect transistor 32 is driven in the same manner as the first stage field effect transistor 16.

Two other significant changes in implementation in FIG. 4 from FIG. 3 exist in the second stage. The first is a variable feedback resistor 40 which controls the gain of the amplifier 21. The second is a signal supply 42 which provides a bucking signal to the gate of the transistor 32. The purpose of this bucking signal will be described shortly. The biasing in FIG. 4 across the transistor 32 and resistor 34 is a combination of a DC voltage with an analog signal $Vx$. In operation the input signal $Ve$ will be multiplied by the analog signal $Vx$.

Figure 5:
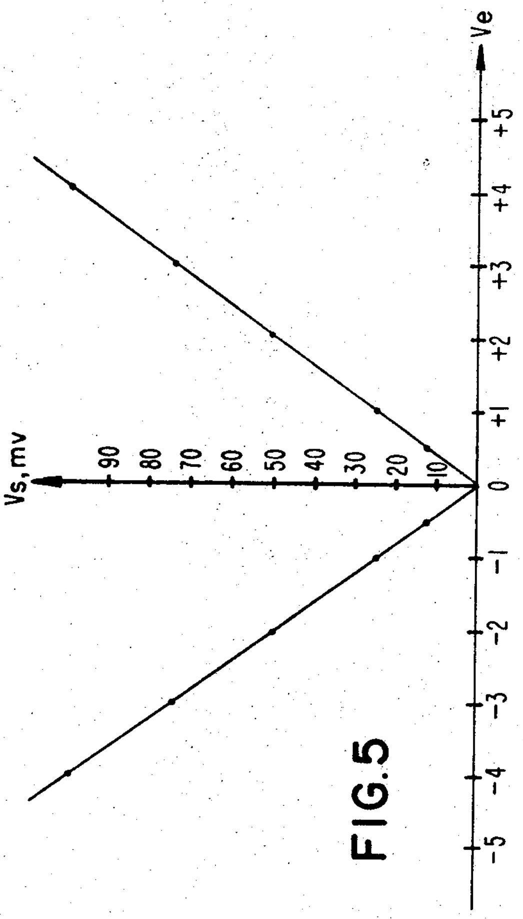
FIG. 5 is a graph showing the linear operation of the circuit in FIG. 4.

The purpose of the bucking signal produced by signal supply 42 is to buck out any flow of current between source to gate in transistor 32 due to signal $Vx$. The 3.8 mv. signal in signal supply 42 differs from the signal $Vx$ only in magnitude. To adjust the analog multiplier in FIG. 4, the input signal $Ve$ is reduced to zero and the resistive potentiometer 44 in signal supply 42 is adjusted until the voltage of $Vs$ is zero. Then voltage $Ve$ is again applied to the input terminal and the resistive potentiometer 40 is adjusted to achieve the linear multiplication of $Ve$ with $Vx$. FIG. 5 shows the results obtained with the circuit of the FIG. 4.

Figure 6:
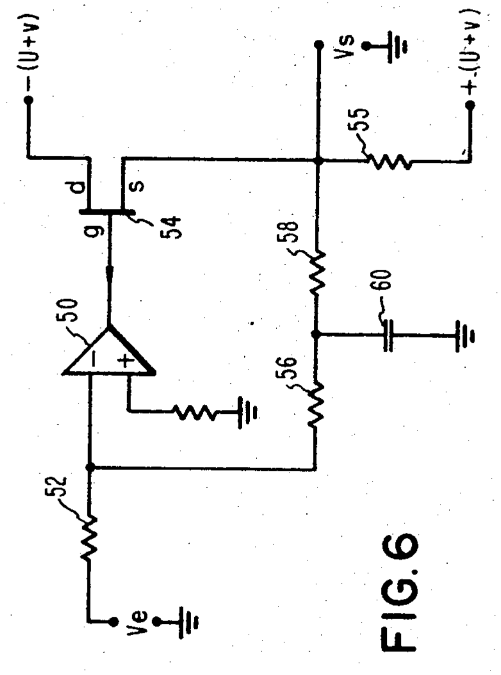
FIG. 6 is a circuit diagram of analog multiplying circuit according to the invention where the signals to be multiplied do not have overlapping frequency domains.

Referring now to FIG. 6, an embodiment of the invention for performing analog multiplication of two signals of nonoverlapping frequency domains is shown. The analog input signal $Ve$ is applied to the input of amplifier 50, through resistor 52. The output from this amplifier is applied to gate $g$ of field effect transistor 54 which, with resistor 55, forms an attenuator. One terminal of this attenuator receives a voltage $+(U+v)$ while its other terminal receives an opposed phase voltage $-(U+v)$.

In the present case, U represents a DC voltage and $v$ an AC signal which is the second signal used in the multiplication (the first signal being $Ve$). A feedback loop, comprising resistors 56 and 58 and capacitor 60, connects source $s$ of transistor 54 to an amplifier 50 input.

The operation of such an assembly is identical to that already described for the first stage of FIG. 3. Capacitor 60 is placed in the feedback loop to stop signal $v$ from reaching the amplifier 50. This signal $v$, whose frequency is higher than that of signal $Ve$, is thus grounded.

From the embodiment shown in FIG. 3, it can be seen that the first stage provides an output signal V*o* which varied linearly when the circuit control voltage V*e* also varied linearly. By applying voltage *v* (which is the second one used in the multiplication) to the same terminals where voltage V in FIG. 3 is applied, with corresponding phases multiplication of V*e* and *v* results. In FIG. 3, voltage *v* would react upon the input of amplifier 14, through the feedback loop. In FIG. 6 to stop feedback of *v*, a capacitor 60 was included between resistors 56 and 58 to ground voltage *v* so that it could not affect the input of amplifier 50 (FIG. 6). It can be seen that such a system can operate only if voltages V*e* and *v* are not both in the same frequency domain, if this is not so voltage V*e* could also pass through capacitor C and be grounded. In consequence, FIG. 6 presents a device which can multiply a DC or AC voltage V*e*, by an AC voltage *v* located in a frequency domain which is higher than that of voltage V*e*.

If voltage V*e* is applied to the input, and only voltage U to the attenuator of FIG. 6, we have on one hand:

$$Vs_1=1\times\frac{Rds-R55}{Rds+R55}=U\times f(Vgs,\ R55)$$

and on the other hand:

$$Vs_1=\frac{R56+R58}{R52}\times Ve$$

therefore:

$$f(Vgs,\ R55)=\frac{R56+R58}{R52}\times\frac{Ve}{U}\qquad(12)$$

The multiplication of V*e* by *v* is carried out on the same transistor 54 and in consequence, if only *v* is now applied to the attenuator, we obtain:

$$Vs_2=v\times f(Vgs,\ \mathrm{R}55)\qquad(13)$$

When both voltages U and *v* are applied, function *f*(V*gs*, R55) remains the same and, consequently, by identifying Expressions 12 and 13 we have:

$$Vs=v\times\frac{R56+R58}{R52}\times\frac{Ve}{U}$$

that is, within a *k* constant factor:

$$Vs=k\times v\times xVe$$

Figure 7:
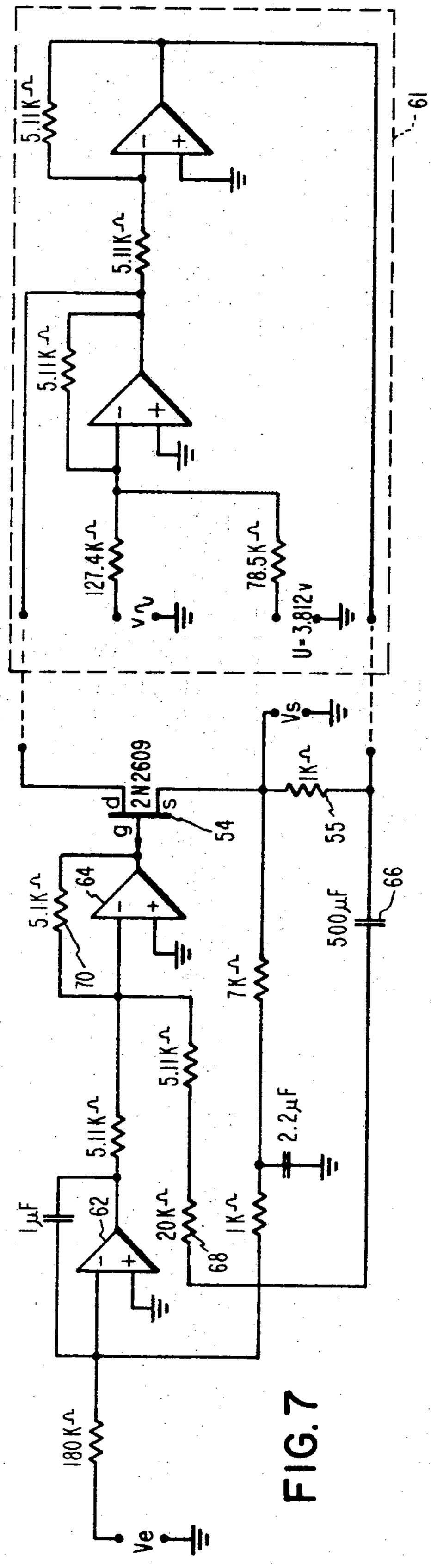
FIG. 7 is a more detailed implementation of an analog multiplier of the type shown in FIG. 6.
Figure 8:
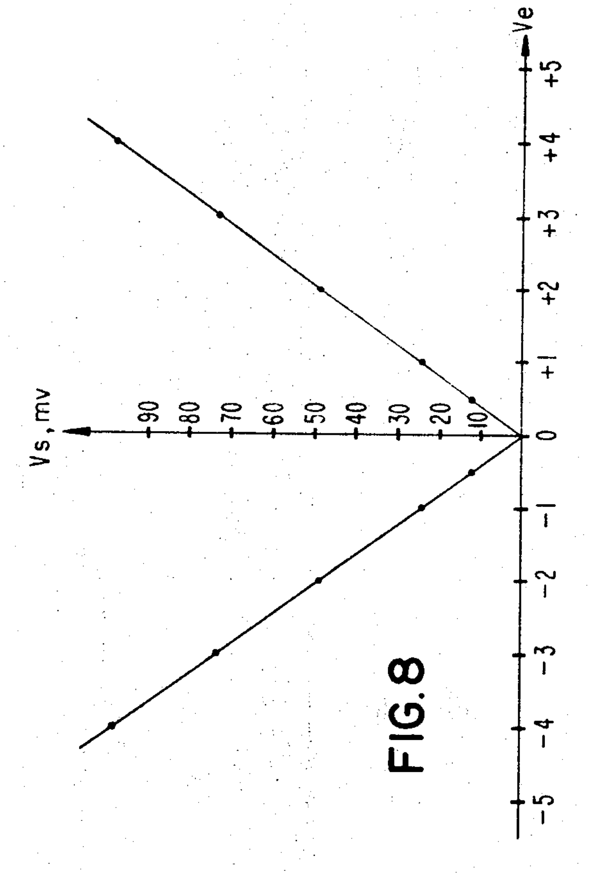
FIG. 8 is a graph showing the linear multiplication affect achieved with the circuit in FIG. 7.

An embodiment of the invention, similar to that in FIG. 6, is illustrated on FIG. 7; the output voltage V*s*, in function of the input voltage V*e* of this circuit, is illustrated on FIG. 8. As it can be seen from this last figure, the variation is perfectly linear and passes exactly at the zero mark. The second part of FIG. 7, on the right, represents a typical signal supply device 61 for the attenuator formed by transistor 54 and resistor 55. This device 61 allows simultaneous and accurate variation of the voltages applied, in opposed phases, to the attentuator.

FIG. 7 embodiment differs from that in FIG. 6 in the use of two amplifiers 62 and 64 with capacitive feedback 66 to the second series amplifier 64. The purpose of the capacitive feedback 66 is to provide a bucking signal to the gate of transistor 54. The bucking signal is used to inhibit any flow of signal *v* between the gate and source of transistor 54. Zero adjustment is accomplished by placing $Ve=0$ and adjusting potentiometer 68 until $Vs=0$.

Both amplifiers 62 and 64 have an individual feedback loop. The resistive feedback 70 around amplifier 64 cooperates with input resistors of amplifier 64 to control gain from the input resistors to the output of amplifier 64. The capacitive feedback 72 around amplifier 62 cooperates with the input resistors of amplifier 62 to act as an integrator. The integrator has a smoothing effect on the signal Ve.

Briefly, we can see that the invention provides a new and improved means to effect analog computation, performing in the neighborhood of "zero" and having a very much improved accuracy in comparison with the prior art. It will be appreciated by one skilled in the art that any variable impedance device could be substituted for the field effect transistors so long as there is good isolation between impedance terminals and the impedance control terminal.

While the new fundamental characteristics of the invention have been represented and described in reference to preferred embodiments, it will be understood that those skilled in the art can make substittuions, deletions or modifications of forms, or details to the devices described and represented, without departing from the spirit and scope of the invention.

What is claimed is:

1. An analog multiplier circuit for multiplying a first analog signal by a second analog signal comprising:

a nonlinear variable impedance means for varying the impedance in response to a control signal;

a control signal drive means for driving said nonlinear variable impedance means with a nonlinear control signal, said drive means responsive to the first analog signal and to the impedance of said nonlinear impedance means so that said impedance means is driven to vary the impedance linearly with the first analog signal; and means for applying the second analog signal across the impedance of said nonlinear variable impedance means so that the signal passed by said impedance means will be the product of the first and second analog signal.

2. The analog multiplier circuit of claim 1 for multiplying first and second analog signals of nonoverlapping frequency domains wherein said control signal drive means comprises:

amplifying means for driving said impedance means in response to the first analog signal and a feedback signal from said impedance means, the feedback signal being indicative of the impedance of said impedance means;

means for filtering the feedback signal so that only frequencies due to the first analog signal are passed back from said impedance means to said amplifying means.

3. The analog multiplier circuit of claim 1 for multiplying first and second analog signals of overlapping frequency domains wherein said control signal drive means comprises:

a first amplifying means for generating a nonlinear control signal dependent on the first analog signal;

a second amplifying means responsive to the nonlinear control signal from said first amplifying means for driving said impedance means according to the control signal so that the impedance varies linearly with the first analog signal.

4. An analog multiplier circuit for multiplying a first analog signal by a second analog signal comprising:

a field effect transistor for varying its resistance from drain to source in accordance with a control signal applied to its gate;

an amplifying means for driving the gate of said transistor with a nonlinear control signal;

a feedback means for feeding back a signal from the source terminal of said transistor to the input of said amplifying means;

said amplifying means responsive to said feedback signal and the first analog signal so that said transistor is driven to vary its resistance from drain to source linearly with the first analog signal; and means for applying the second analog signal across the resistance from drain to source of said transistor so that the current through the resistance will be the product of the first and second analog signals.

5. An analog multiplier circuit comprising the multiplier circuit of claim 4 and in addition:

bucking means responsive to the second analog signal for driving the gate of said transistor to block the signal flow from the source to gate due to the second analog signal.

6. The analog multiplier circuit of claim 4 for multiplying first and second analog signals of nonoverlapping frequency domains wherein said feedback means comprises:

a feedback path connected between the source terminal of said transistor and the input of said amplifying means;

a filter means in said feedback path for passing only frequencies of the first analog signal.

7. An analog multiplier circuit for multiplying a first analog signal by a second analog signal whose frequency domain overlaps the first analog signals frequency domain comprising:

a field effect transistor for varying its resistance from drain to source in accordance with a control signal applied to its gate;

an amplifying means for driving the gate of said transistor with a nonlinear control signal;

a feedback means for feeding back a signal from the source terminal of said transistor to the input of said amplifying means;

said amplifying means responsive to said feedback signal and the first analog signal so that said transistor is driven to vary its resistance from drain to source linearly with the first analog signal;

a second field effect transistor having the same characteristic as said first field effect transistor;

a difference amplifying means responsive to the gate voltage and the source voltage from said first field effect transistor for driving said second field effect transistor in the same manner as said first field effect transistor so that the resistance from drain to source in said second field effect transistor varies linearly with the first analog signal; and means for applying the second analog signal across the resistance from drain to source of the second field effect transistor so that current through the resistance will be the product of the first and second analog signals.

8. An analog multiplier circuit for multiplying a first analog signal by a second analog signal whose frequency domain overlaps the first analog signal's frequency domain comprising:

a field effect transistor for varying its resistance from drain to source in accordance with a control signal applied to its gate;

an amplifying means for driving the gate of said transistor with a nonlinear control signal;

a feedback means for feeding back a signal from the source terminal of said transistor to the input of said amplifying means;

said amplifying means responsive to said feedback signal and the first analog signal so that said transistor is driven to vary its resistance from drain to source linearly with the first analog signal;

a second field effect transistor having the same characteristic as said first field effect transistor;

a second amplifying means responsive to the gate voltage applied to said first field effect transistor for driving said second field effect transistor in the same manner as said first transistor so that the resistance from drain to source in said second field effect transistor varies linearly with the first analog signal; and means for applying the second analog signal across the resistance from drain to source of the second field effect transistor so that current through the resistance will be the product of the first and second analog signals.

References Cited

UNITED STATES PATENTS

| | | | |
|---|---|---|---|
| 3,292,013 | 12/1966 | Golahny | 328—161X |
| 3,368,066 | 2/1968 | Miller et al. | 328—160X |
| 3,430,152 | 2/1969 | Walsh | 330—26X |
| 3,448,297 | 6/1969 | Rhodes | 328—160X |

JOHN S. HEYMAN, Primary Examiner

U.S. Cl. X.R.

235—150.52; 307—304; 328—160; 330—26, 86